July 13, 1965 A. D. WENGER ETAL 3,193,886
CABINET JOINT
Filed Oct. 24, 1962
FIG.I.
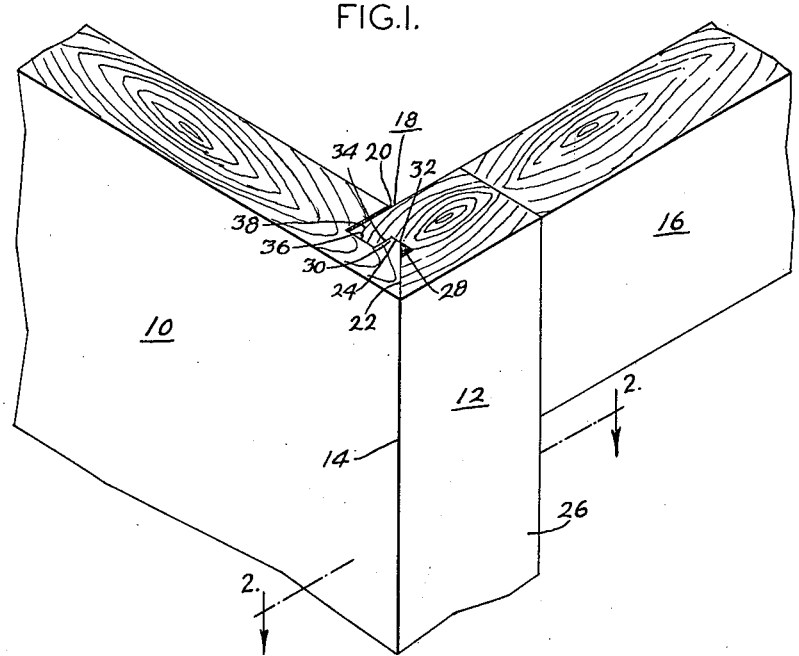
FIG.2.
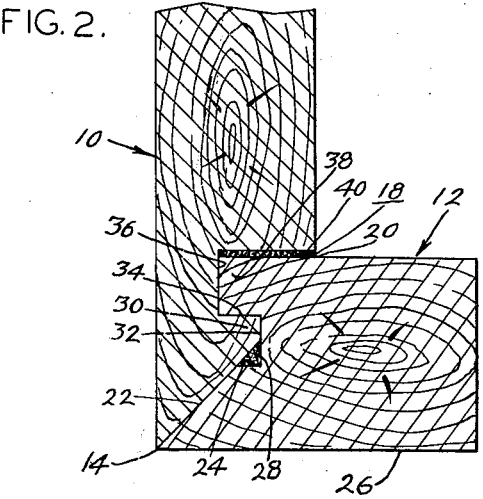
INVENTOR:
ARTHUR D. WENGER
BY JAY G. HENNE
Howson & Howson
ATTYS.

3,193,886
CABINET JOINT
Arthur D. Wenger, Reading, and Jay G. Henne, Laureldale, Pa., assignors to Quaker Maid Kitchens, Inc., Leesport, Pa., a corporation of Pennsylvania
Filed Oct. 24, 1962, Ser. No. 232,824
4 Claims. (Cl. 20—92)

The present invention relates generally to cabinet joints and more specifically to a novel glue-fastened corner joint for wooden cabinet structures which combines unusual strength with the attractive appearance of a miter joint and an ease of assembly superior to even a simple square tongue and groove joint.

Corner joints have presented long-existent problems in the cabinet making field and create particular difficulties in plywood cabinet construction. A corner joint has not heretofore been developed which provides the uninterrupted appearance of costly, high-grade mitered cabinet work which at the same time is adapted to production line assembly techniques.

Corner constructions presently used are, for the most part, characterized by a conspicuous edge grain butt joint which is subject to separation in aging due to repeated uneven contraction and expansion of the abutting elements. Furthermore, assembly of such joints requires the use of lengthy clamps and usually nails or screws which further detract from the finished appearance of the cabinet. A misguided screwdriver or errant hammer blow can result in unsightly scars and it is thus highly desirable that a joint fastened solely with glue be utilized.

It is accordingly a first object of the present invention to provide a cabinet corner joint having a mitered exterior corner providing a smooth, nearly invisible joint, free of exposed edge grain.

An additional object of the invention is to provide a corner joint which is self-aligning and which may be assembled without the aid of jigs or special equipment.

A further object of the invention is to provide a corner joint having an exceptionally large gluing surface area, thereby insuring adequate strength without additional fastenings.

Another object of the invention is to provide a corner joint having interiorly co-acting shoulders which serve to strengthen the joint as well as to align the joint edges during assembly.

A still further object of the invention is to provide a mitered cabinet joint which may be clamped along a single face of the cabinet to effectively apply pressure to the joined glue surfaces.

Still another object of the invention is to provide a self-aligning and self-squaring cabinet corner joint which may be quickly assembled by unskilled workers using only glue and clamps to provide a strong, permanent joint.

The joint of the present invention, in realizing these and other objects, is broadly characterized considered from the exterior to the interior corner by a mitered portion leading into a shoulder and groove portion, the shoulder and groove aligned in the plane of one of the cabinet elements such that glue-setting pressure may be applied to the joint solely by the use of clamps applied parallel to the face of that element perpendicular to the corner edge.

Additional objects and advantages of the invention will be more readily apparent from the following detailed description of an embodiment thereof when taken together with the accompanying drawings, in which:

FIG. 1 is a fragmentary perspective view of a wooden cabinet having the top removed to show a corner joint constructed in accordance with the present invention; and FIG. 2 is an enlarged sectional view of the corner joint taken along line 2—2 of FIG. 1.

Referring to the drawings, a cabinet frame is shown which includes side panel 10 joined to stile 12 forming corner edge 14. Rail 16 extends across the cabinet front from stile 12 to which it is secured such as by a mortise and tenon joint.

The side panel 10 is joined with the stile 12 by the glued corner joint 18 embodying the present invention. Considering the joint configuration from the corner edge 14 to the inner corner 20, the stile and side panel are mitered at a 45 degree angle from the corner edge 14 inwardly to a point approximately half way through the joint. The mitered surface of the stile 12 terminates inwardly at the outer edge of a groove in the stile, the groove having an inner and outer side in a bottom extending between the sides. In the present instance the groove is a square groove 24 which is cut into the stile 12 parallel with the face 26 of the stile to such a depth as to intersect with the continuing miter of the side panel at approximately the center of the groove. Triangular glue pocket 28 is formed in the outer region of the slot by the side panel miter.

The side panel is cut to form a beveled tongue or shoulder 30 having squared faces accurately milled or cut to join snugly with the bottom and side of the groove when the stile and side panel mitered surfaces are in abutting alignment. The mitered surface of the side panel 10 defines one face of the beveled tongue or shoulder 30 which is received by the groove in the stile. The co-acting shoulder and groove thus provide glue joint 32 between the top of the shoulder 30 and the inner face of the groove, as well as glue joint 34 between the inner shoulder face and the inner side of the groove.

The forming of the shoulder 30 of the side panel includes the cutting of slot 36 in the side panel to receive the tongue 38 of the stile. The inner edge 40 of slot 36 is cut to permit a substantial clearance of the tongue 38, thereby facilitating assembly of the joint as well as providing an escape route for excess glue which otherwise would be trapped within the joint.

The glue joints 32 and 34 are critical surfaces which must be accurately mated so as to be squarely engaged when the mitered surfaces are correctly aligned. The shoulder 30 prevents movement of the joined cabinet elements along the mitered juncture and insures the juncture of the elements at the exact corner edge 14.

The shoulder 30 co-acting with groove 24 not only permits a rapid positioning of the joint elements, but in addition permits the critical joined surfaces, namely the miter 22, and glue joints 32 and 34 to be clamped under glue-setting pressure by clamps applied parallel with the face 26 of the sile. Inasmuch as the stile of a cabinet is usually of relatively narrow width, clamps of a short span may be used.

Assembly of the joints entails simply the steps of applying glue to the joint surfaces, placing the surfaces in abutting relation, and applying a clamping force in the manner indicated. The miter portion of the joint and the shoulder and groove joints combine to provide a squared disposition of the joint elements and an accurate alignment of the joint corner edge. Squaring devices and gluing jigs are unnecessary in view of the self-aligning and self-squaring characteristics of the joint.

Excess glue which may develop within the joint is drained into the glue pocket 28 at the inner end of the miter portion of the joint. Similarly, excess glue may be squeezed into the open area of the slot 36 between the slot edge 40 and the tongue 38.

From the foregoing it can be seen that the present corner joint provides the clean, almost invisible appearance typical of a miter joint but requires only a fraction of the assembly time normally necessary for a miter joint. The simplicity and accuracy of assembly and clean appearance are not obtained by sacrificing strength. The present joint is considerably stronger than a straight mitered joint due to the shoulder construction and the exceptionally large glue surface area.

Manifestly, changes and details in construction can be effected by those skilled in the art without departing from the spirit and the scope of the invention as defined in and limited solely by the appended claims.

We claim:

1. A glue fastened cabinet corner joint for joining a cabinet side panel to a perpendicularly disposed stile to form a cabinet corner edge, said joint comprising engaged mitered surfaces of the side panel and stile extending inwardly from the corner edge, the mitered surface of the stile terminating inwardly at the outer edge of a groove in the stile, said groove having an inner and outer side and a bottom extending between the inner and outer sides, the mitered planar surface of the side panel extending inwardly of the inward termination of the mitered surface of the stile in the plane of said mitered surface and intercepting the bottom of said groove at a point between the sides of said groove to define a glue pocket between the outer edge of said groove and the point of intersection of said mitered surface of said side panel with the bottom of the groove, the mitered surface of said side panel defining one face of a beveled tongue which is received by the groove in said stile, said tongue having an inner face abutting the inner side of said groove upon alignment of said mitered surfaces, a slot in said side panel adjoining and partly defined by said beveled tongue, a tongue of said stile extending into said slot in the side panel, the outer side of said tongue being defined in part by the inner side of said groove, and a substantial clearance between the inner edge of said slot and the inner side of said tongue to facilitate assembly of said joint, said stile and side panel being glued together whereby a quantity of glue enters said pocket and said clearance between the inner edge of said slot and the inner side of said tongue, said clearance in conjunction with said beveled shoulder and groove permitting, during assembly of the joint, a limited relative movement of said side panel and stile perpendicular to the corner edge in the plane of the mitered surfaces, the clamping of said side panel and stile by a clamping force applied in the plane of the stile perpendicular to the corner edge automatically aligning said corner edge and applying pressure to all of the engaged surfaces of said joint.

2. A glue fastened cabinet corner joint as claimed in claim 1 wherein said groove in said stile is square, the sides of said groove being parallel with the face of the stile.

3. A glue fastened cabinet corner joint as claimed in claim 1 wherein said slot in said side panel is perpendicular to the plane of the side panel and is of a depth substantially half the thickness of the side panel.

4. A glue fastened cabinet corner joint for joining a cabinet side panel to a perpendicularly disposed stile to form a cabinet corner edge, said joint comprising engaged mitered surfaces of the side panel and stile extending inwardly from the corner edge, the mitered surface of the stile terminating inwardly at the outer edge of a square groove in the stile, said square groove having inner and outer sides and a bottom face between the sides, the sides of said groove being parallel with the face of the stile, the mitered planar surface of the side panel extending inwardly of the inward termination of the mitered surface of the stile in the plane of said mitered surface and intercepting the bottom of said groove at substantially the center of the bottom face of said groove to define a glue pocket between the outer edge of said groove and the point of intersection of said mitered surface of said side panel with the inner face of the groove, the mitered surface of said side panel defining one face of a beveled tongue which is received by the square groove in said stile, said tongue having an inner face abutting the inner side of said groove upon alignment of said mitered surfaces, a slot in said side panel adjoining and partly defined by said beveled tongue, said slot being perpendicular to the plane of the side panel and being of a depth substantially half the thickness of the side panel, a tongue of said stile extending into said slot in the side panel, the outer side of said tongue being defined in part by the inner side of said groove, and a substantial clearance between the inner edge of said slot and the inner side of said tongue to facilitate assembly of said joint, said stile and side panel being glued together whereby a quantity of glue enters said pocket and said clearance between the inner edge of said slot and the inner side of said tongue, said clearance in conjunction with said beveled shoulder and groove permitting, during assembly of the joint, a limited relative movement of said side panel and stile perpendicular to the corner edge in the plane of the mitered surfaces, the clamping of said side panel and stile by a clamping force applied in the plane of the stile perpendicular to the corner edge automatically aligning said corner edge and applying pressure to all of the engaged surfaces of said joint.

References Cited by the Examiner

UNITED STATES PATENTS

| | | | |
|---|---|---|---|
| 443,271 | 12/90 | Dumas | 20—92 XR |
| 569,235 | 10/96 | Rockwell | 20—92 |
| 991,722 | 5/11 | Hourd | 20—92 |
| 1,132,156 | 3/15 | Bohner | 20—92 XR |
| 1,210,688 | 1/17 | Peirce et al. | 20—92 XR |
| 1,533,099 | 4/25 | Carroll | 20—92 XR |
| 1,890,999 | 12/32 | Loftin | 20—92 XR |

OTHER REFERENCES

"The Carpenters and Joiners Assistant," publication by Newlands, published 1890. Plate 70 relied upon.

FRANK L. ABBOTT, *Primary Examiner*.

JACOB L. NACKENOFF, *Examiner*.